(12) United States Patent
Terada et al.

(10) Patent No.: US 8,544,276 B2
(45) Date of Patent: Oct. 1, 2013

(54) GAS TURBINE COMBUSTOR HAVING A DUAL FUEL SUPPLY SYSTEM

(75) Inventors: Yoshitaka Terada, Takasago (JP); Tetsu Konishi, Takasago (JP); Katsuyoshi Omae, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 783 days.

(21) Appl. No.: 12/670,039

(22) PCT Filed: Aug. 26, 2008

(86) PCT No.: PCT/JP2008/065136
§ 371 (c)(1),
(2), (4) Date: Mar. 26, 2010

(87) PCT Pub. No.: WO2009/028474
PCT Pub. Date: Mar. 5, 2009

(65) Prior Publication Data
US 2010/0192584 A1     Aug. 5, 2010

(30) Foreign Application Priority Data
Aug. 29, 2007    (JP) .................................. 2007-222037

(51) Int. Cl.
*F02C 1/00* (2006.01)
*F02G 3/00* (2006.01)

(52) U.S. Cl.
USPC ................... 60/746; 60/740; 60/734; 60/747; 60/742; 60/39.463

(58) Field of Classification Search
USPC ................... 60/734, 737, 738, 739, 740, 741, 60/60/742, 743, 746, 747, 748, 804, 39.463, 60/39.465
See application file for complete search history.

(56) References Cited

U.S. PATENT DOCUMENTS

| 2,690,648 A | 10/1954 | Pearce et al. |
| 4,258,544 A | 3/1981 | Gebhart et al. |

(Continued)

FOREIGN PATENT DOCUMENTS

| CN | 1578874 A | 2/2005 |
| JP | 55-500647 A | 9/1980 |

(Continued)

OTHER PUBLICATIONS

International Search Report of PCT/JP2008/065136, mailing date of Oct. 28, 2008.

(Continued)

*Primary Examiner* — William H Rodriguez
(74) *Attorney, Agent, or Firm* — Westerman, Hattori, Daniels & Adrian, LLP (57) ABSTRACT

An object is to provide a low cost gas turbine combustor. The gas turbine combustor has a plurality of main nozzles annularly supported on a nozzle pipe base (11), and the main nozzles each have an oil fuel path for supplying oil fuel and a gas fuel path for supplying gas fuel. A plurality of the oil fuel paths are provided to penetrate the nozzle pipe base (11), and a plurality of lengths of upright piping (21) are provided to be connected to the oil fuel paths, respectively, and be erected on the nozzle pipe base (11). A plurality of lengths of connection piping (22) for interconnecting the lengths of the upright piping (21) in a polygonal shape at a minimum distance are provided outside the nozzle pipe base (11). An oil fuel supply section (14) is connected to one of the lengths of the connection piping (22) to distribute oil fuel to each of the oil fuel paths.

3 Claims, 6 Drawing Sheets

(56) References Cited

U.S. PATENT DOCUMENTS

| | | | |
|---|---|---|---|
| 4,467,610 A | 8/1984 | Pearson et al. | |
| 4,763,481 A * | 8/1988 | Cannon | 60/737 |
| 5,231,833 A | 8/1993 | MacLean et al. | |
| 5,415,000 A * | 5/1995 | Mumford et al. | 60/747 |
| 5,657,632 A * | 8/1997 | Foss | 60/742 |
| 6,038,861 A | 3/2000 | Amos et al. | |
| 6,862,888 B2 * | 3/2005 | Akagi et al. | 60/740 |
| 6,957,537 B2 * | 10/2005 | Hirasaki | 60/746 |
| 2013/0019584 A1 * | 1/2013 | Koizumi et al. | 60/39.465 |

FOREIGN PATENT DOCUMENTS

| | | |
|---|---|---|
| JP | 57-186026 A | 11/1982 |
| JP | 4-314933 A | 11/1992 |
| JP | 8-5075 A | 1/1996 |
| JP | 3495730 B2 | 2/2004 |

OTHER PUBLICATIONS

Chinese Office Action dated Aug. 3, 2012, issued in corresponding Chinese patent application No. 200880103222.9, w/ English translation.

* cited by examiner

GAS TURBINE COMBUSTOR HAVING A DUAL FUEL SUPPLY SYSTEM

TECHNICAL FIELD

This invention relates to a gas turbine combustor.

BACKGROUND ART

Figure 5:
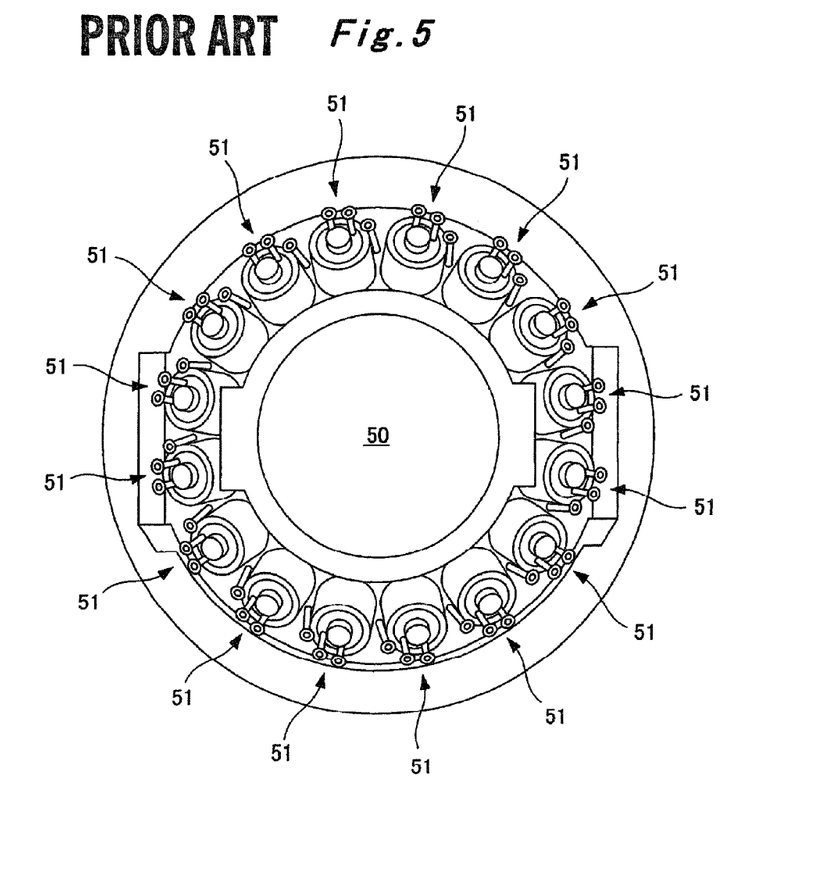
[FIG. 5] is a view, taken from the upstream side in the direction of a flow, of a plurality of the gas turbine combustors arranged annularly.
Figures 6A, 6B:
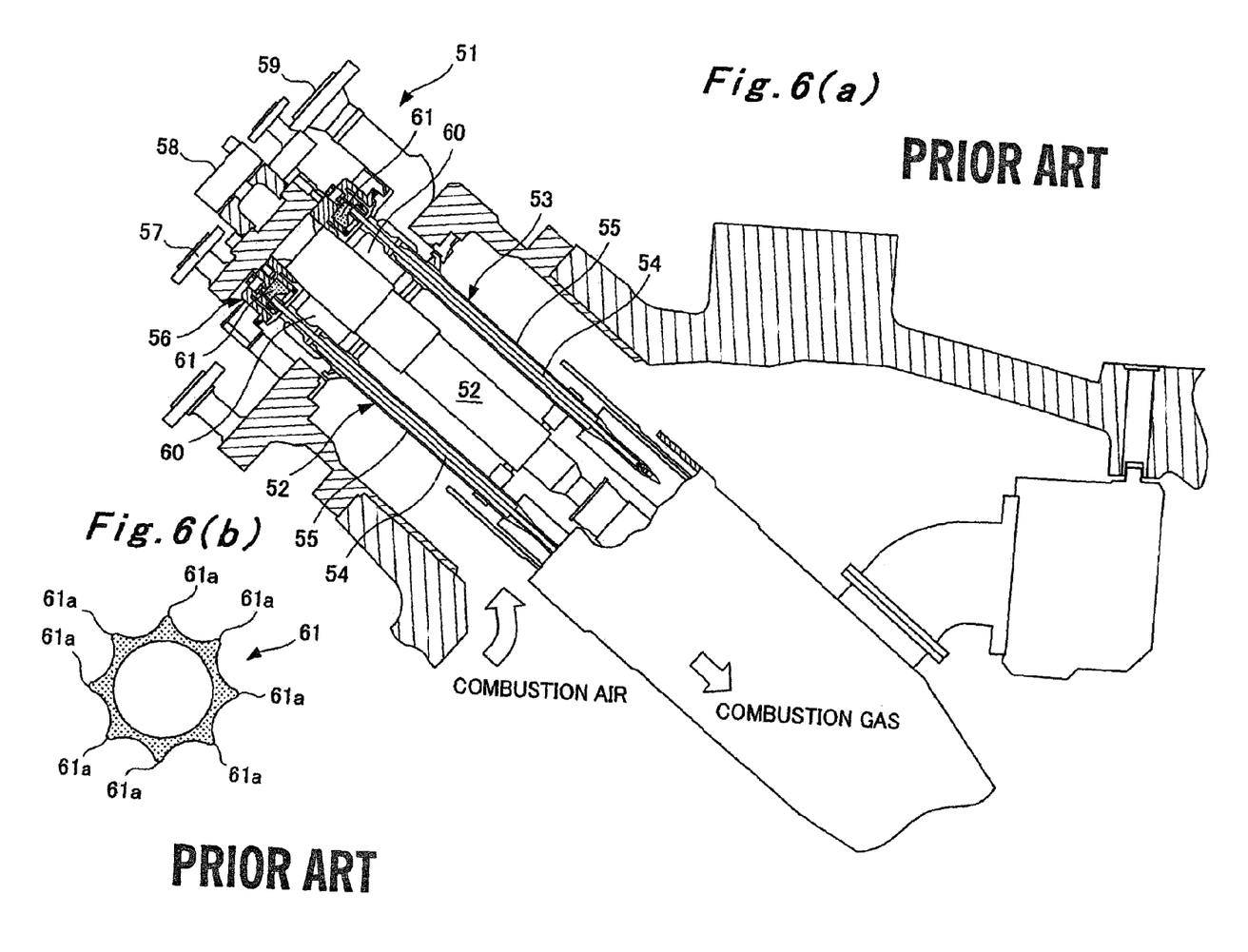

A plurality of combustors 51 of a gas turbine are mounted annularly around a casing 50 of the gas turbine, as shown in FIG. 5. Each combustor 51 has a pilot nozzle 52, and a plurality of main nozzles 53 arranged annularly around the pilot nozzle 52, and the respective combustors 51 are annularly supported on a nozzle pipe base 56, as shown in FIG. 6(*a*). In the case of a dual mode in which fuel is switched between oil fuel and gas fuel, the main nozzle 53 is of a double structure consisting of a central pipe 54 for passage of oil fuel, and an outer pipe 55 disposed on the outer periphery of the central pipe 54 and designed for passage of gas fuel. The pilot nozzle 52 also has a similar double structure.

Patent Document 1: U.S. Pat. No. 4,258,544
Patent Document 2: Japanese Patent No. 3495730

DISCLOSURE OF THE INVENTION

Problems to be Solved by the Invention

As described above, the pilot nozzle 52 and the main nozzles 53, in the dual mode gas turbine combustor, are each of a double structure, and constitute a fuel supply system, independently of each other. If gas fuel is used in the pilot nozzle 52, for example, gas fuel is supplied from a pilot nozzle gas fuel supply section 57. If oil fuel is used in the pilot nozzle 52, oil fuel is supplied from a pilot nozzle oil fuel supply section 58. If gas fuel is used in the main nozzles 53, gas fuel is supplied from a main nozzle gas fuel supply section 59, and supplied to the interior of the outer pipe 55 of each main nozzle 53 by way of a gas chamber 60. If oil fuel is used in the main nozzles 53, oil fuel is supplied from a main nozzle oil fuel supply section (not shown), and supplied to the interior of the central pipe 54 of each main nozzle 53 by way of an oil chamber 61.

The oil chamber 61 is formed in the interior of the nozzle pipe base 56 and, when viewed from the head side of the combustor 51, is formed as a star-shaped space, as shown in FIG. 6(*b*). The central pipes 54 are disposed at apical portions 61*a* of the oil chamber 61. As shown in FIG. 5, a plurality of the combustors 51 of the same structure are annularly arranged around the casing 50 of the gas turbine, with the outer peripheral direction of the combustor 51 being determined definitely. In the oil chamber 61, therefore, the lowermost position differs among the respective combustors 51. In this view, as shown in FIG. 6(*b*), the oil chamber 61 is star-shaped, whereby one of the plurality of apical portions 61*a* is located at the lowermost position, no matter which position the combustor 51 is located at. Thus, even when the supply of oil fuel is stopped, oil fuel accumulates in the lowermost apical portion 61*a*. Oil fuel is air-purged via the central pipe 54 disposed at that position, and the oil fuel can be kept from remaining.

The nozzle pipe base 56 is under the influence of combustion air at a high temperature (e.g., of the order of 450° C.) which passes through the interior of the combustor 51. If oil fuel remains in the oil chamber 61, the remaining oil fuel may be coked by the influence of the high temperature to cause clogging. Because of the above-mentioned structure, however, oil fuel is kept from remaining, thereby preventing the coking of the oil fuel. There has been a proposal for a configuration in which the star-shaped oil chamber 61 is provided within the nozzle pipe base 56, and a pneumatic heat insulating layer is provided around the oil chamber 61 to curb the influence of the temperature (cited document 2).

However, the configuration in which the oil chamber 61 of a complicated shape and the pneumatic heat insulating layer are provided inside the nozzle pipe base 56 requires complicated machining and welding, thus posing the problem of a high cost. Under these circumstances, a gas turbine combustor at a lower cost has been desired.

The present invention has been accomplished in the light of the above-described problems. It is an object of the invention to provide a low cost gas turbine combustor.

Means for Solving the Problems

A gas turbine combustor according to a first aspect of the invention, intended for solving the above problems, is a gas turbine combustor having a plurality of main nozzles annularly supported on a nozzle pipe base, the main nozzles each having an oil fuel path for supplying oil fuel and a gas fuel path for supplying gas fuel, characterized in that a plurality of the oil fuel paths are provided to penetrate the nozzle pipe base, a plurality of lengths of connection piping for interconnecting the oil fuel paths in a polygonal shape at a minimum distance are provided outside the nozzle pipe base, and an oil fuel supply section is connected to one of the lengths of the connection piping to distribute oil fuel to each of the oil fuel paths.

A gas turbine combustor according to a second aspect of the invention, intended for solving the above problems, is a gas turbine combustor having a plurality of main nozzles annularly supported on a nozzle pipe base, the main nozzles each having an oil fuel path for supplying oil fuel and a gas fuel path for supplying gas fuel, characterized in that a plurality of the oil fuel paths are provided to penetrate the nozzle pipe base, and a plurality of lengths of upright piping are provided to be connected to the oil fuel paths, respectively, and be erected on the nozzle pipe base, a plurality of lengths of connection piping for interconnecting the lengths of the upright piping in a polygonal shape at a minimum distance are provided outside the nozzle pipe base, and an oil fuel supply section is connected to one of the lengths of the connection piping to distribute oil fuel to each of the oil fuel paths.

A gas turbine combustor according to a third aspect of the invention, intended for solving the above problems, is the gas turbine combustor according to the first or second aspect of the invention, characterized in that the plurality of the oil fuel paths or the plurality of the lengths of the upright piping are divided into a plurality of groups, in each of the groups, the oil fuel paths or the lengths of the upright piping are interconnected by the lengths of the connection piping, and the oil fuel supply section is connected to one of the lengths of the connection piping in each of the groups.

Effects of the Invention

According to the first aspect of the invention, the oil fuel paths provided to penetrate the nozzle pipe base are interconnected in a polygonal shape at a minimum distance by the plurality of the lengths of the connection piping. Thus, the plurality of the lengths of the connection piping can be used as an oil chamber having a plurality of apices. As a result, during shutoff of oil fuel, no matter which position the gas turbine combustor is mounted at, any one of the apices can be used as an oil reservoir. Oil fuel is discharged from the oil fuel path located at that position, whereby oil fuel can be prevented from remaining.

According to the second aspect of the invention, the lengths of the upright piping connected to the oil fuel paths and erected on the nozzle pipe base are interconnected in a polygonal shape at a minimum distance by the plurality of the lengths of the connection piping. Thus, the plurality of the lengths of the connection piping can be used as an oil chamber having a plurality of apices. As a result, no matter which position the gas turbine combustor is mounted at, any one of the apices can be used as an oil reservoir. Oil fuel is discharged from the oil fuel path located at that position, whereby oil fuel can be prevented from remaining. Moreover, all the lengths of the connection piping are disposed to be separated from the nozzle pipe base by the lengths of the upright piping. This makes it possible to curb the influence of the temperature from the nozzle pipe base which undergoes the influence of the internal temperature of the gas turbine combustor.

The upright piping may have a small wall thickness, except in its portion to be connected (welded), and may be connected in this state to the oil fuel path. In this case, the force which tends to be concentrated on the connected portion can be distributed and borne even by the thin-walled portion of the piping. Consequently, the force acting on the connected portion can be decreased.

According to the third aspect of the invention, the oil fuel paths or the lengths of the upright piping are divided into the groups, and the grouped oil fuel paths or the grouped lengths of the upright piping are interconnected by the lengths of the connection piping. Thus, the maintainability can be enhanced, with interference with the other supply paths being avoided.

BRIEF DESCRIPTION OF THE DRAWINGS

[FIG. 3] (*a*) is a top view showing the head of the gas turbine combustor shown in FIG. 1, and [FIG. 3] (*b*) is a top view showing oil chamber piping extracted therefrom.

[FIG. 6] (*a*) is a schematic view showing a conventional gas turbine combustor, and [FIG. 6] (*b*) is a view showing the shape of an oil chamber.

DESCRIPTION OF THE NUMERALS AND SYMBOLS

1 Gas turbine combustor
2 Pilot nozzle
3 Main nozzle
4 Central pipe
5 Outer pipe
14 Main nozzle oil fuel supply section 20 Oil chamber piping
21 Upright piping
22 Connection piping
23 Connecting joint

BEST MODE FOR CARRYING OUT THE INVENTION

Embodiments of a gas turbine combustor according to the present invention will now be described by reference to FIGS. 1 to 4.

Embodiment 1

Figure 1:
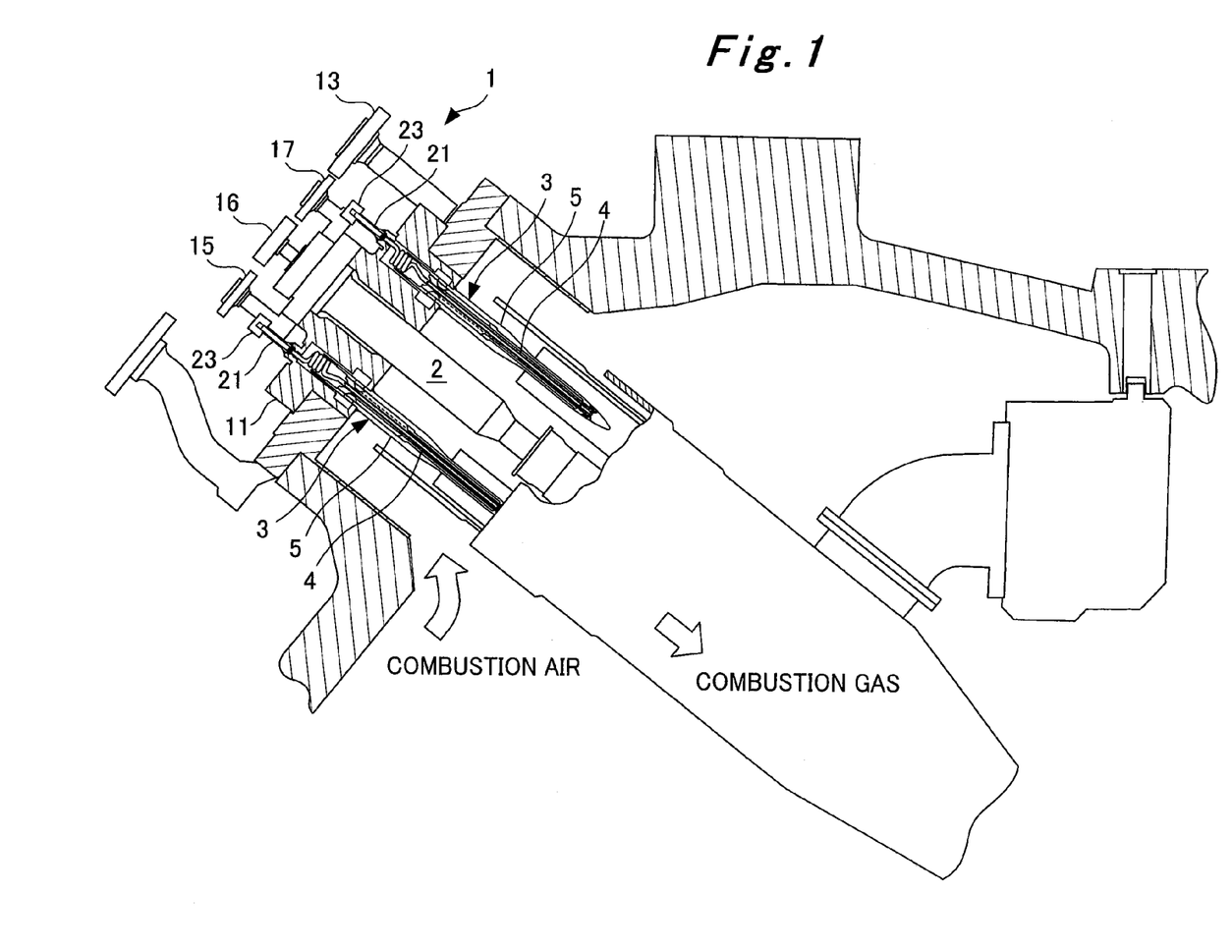
[FIG. 1] is a schematic view showing an embodiment of a gas turbine combustor according to the present invention.

FIG. 1 is a schematic view showing an embodiment of a gas turbine combustor according to the present invention. In the present embodiment as well, a plurality of combustors 1 of a gas turbine are mounted annularly around a casing of the gas turbine, as in the conventional technology. The combustor 1 is in a dual mode capable of switching between oil fuel and gas fuel. As shown in FIG. 1, the combustor 1 has a pilot nozzle 2, and a plurality of (for example, eight) main nozzles 3 arranged annularly around the pilot nozzle 2. The main nozzle 3 is of a double structure consisting of a central pipe 4 which serves as an oil fuel path for passage of oil fuel, and an outer pipe 5 disposed on the outer periphery of the central pipe 4 and serving as a gas fuel path for passage of gas fuel. The pilot nozzle 2 also has a similar double structure.

Figure 2:
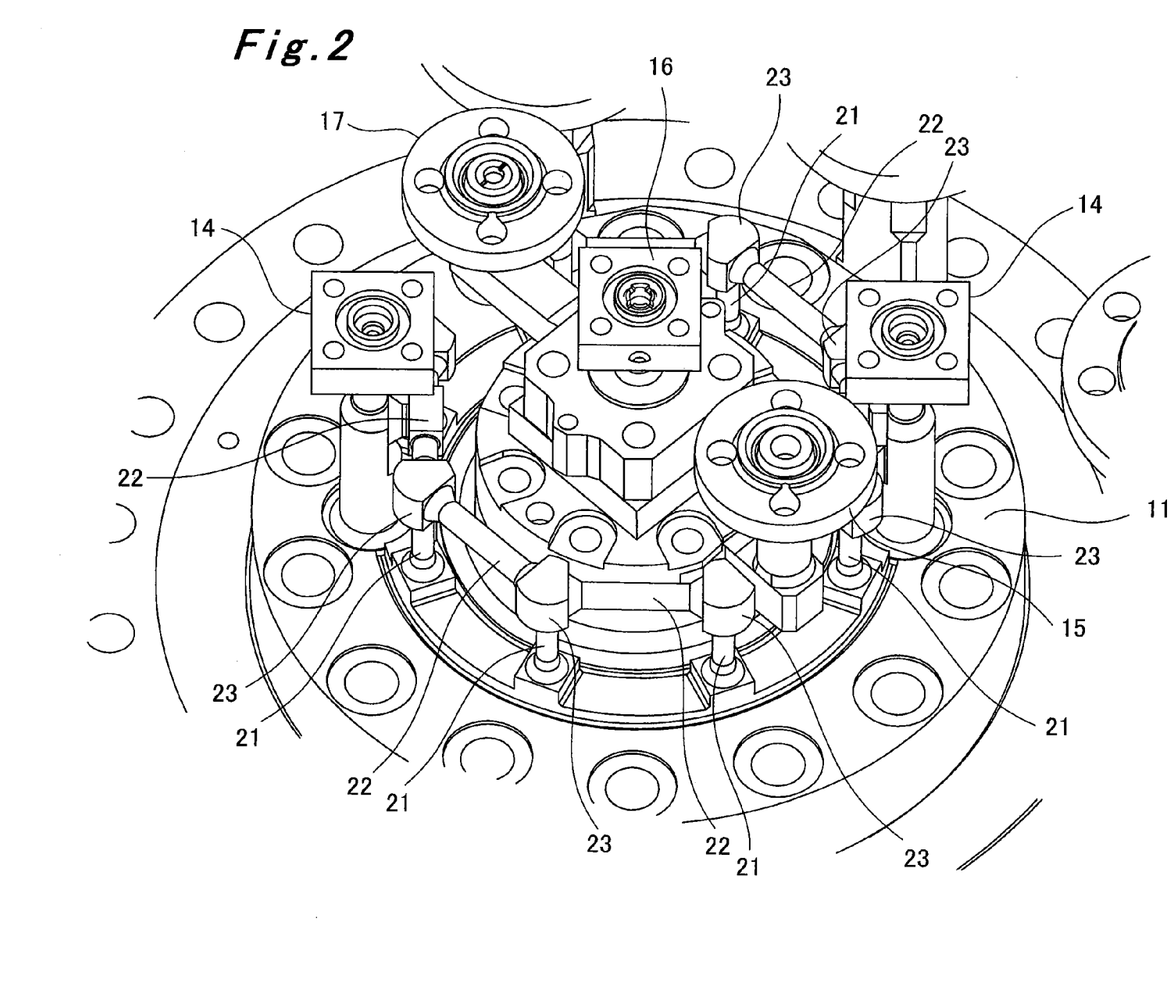
[FIG. 2] is a perspective view showing the head of the gas turbine combustor shown in FIG. 1.
Figure 3A:
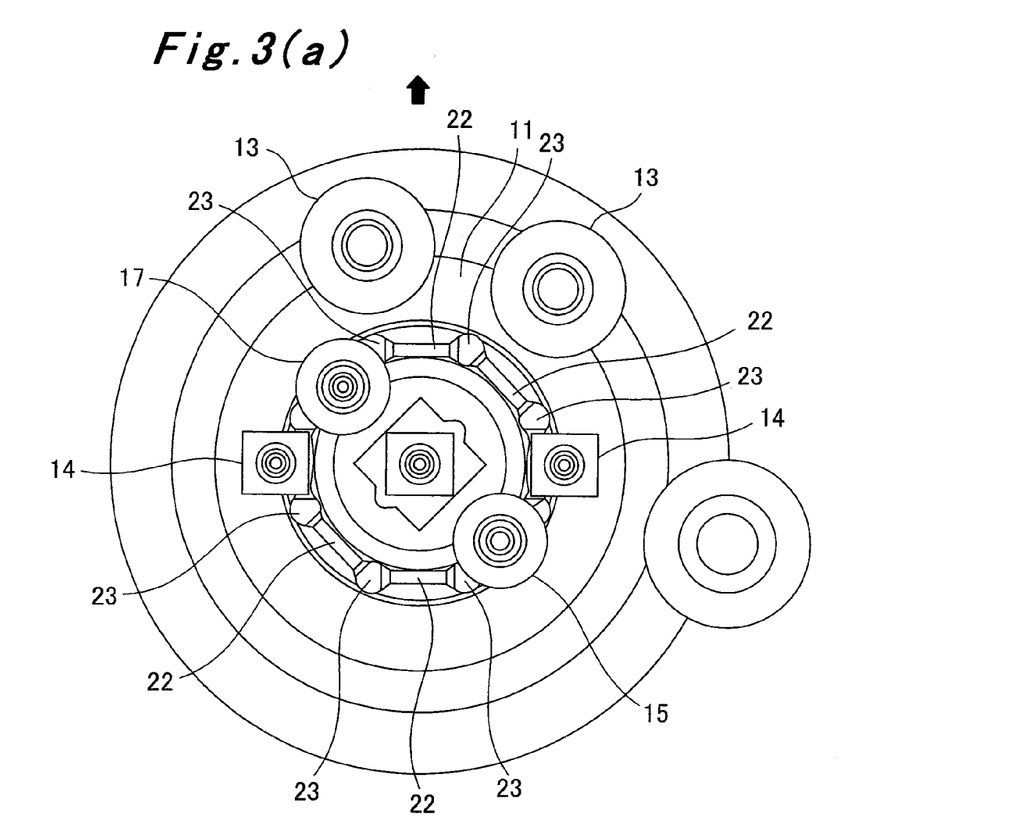
Figure 3B:
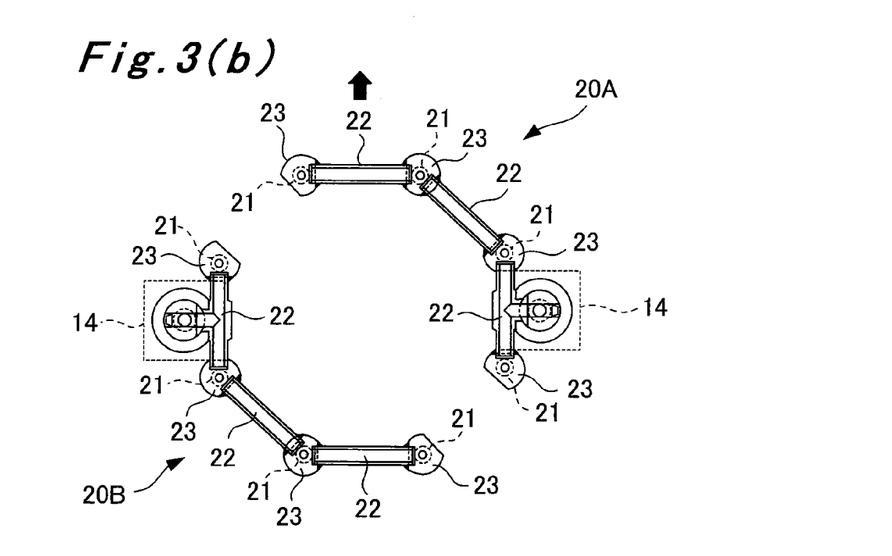
Figure 4:
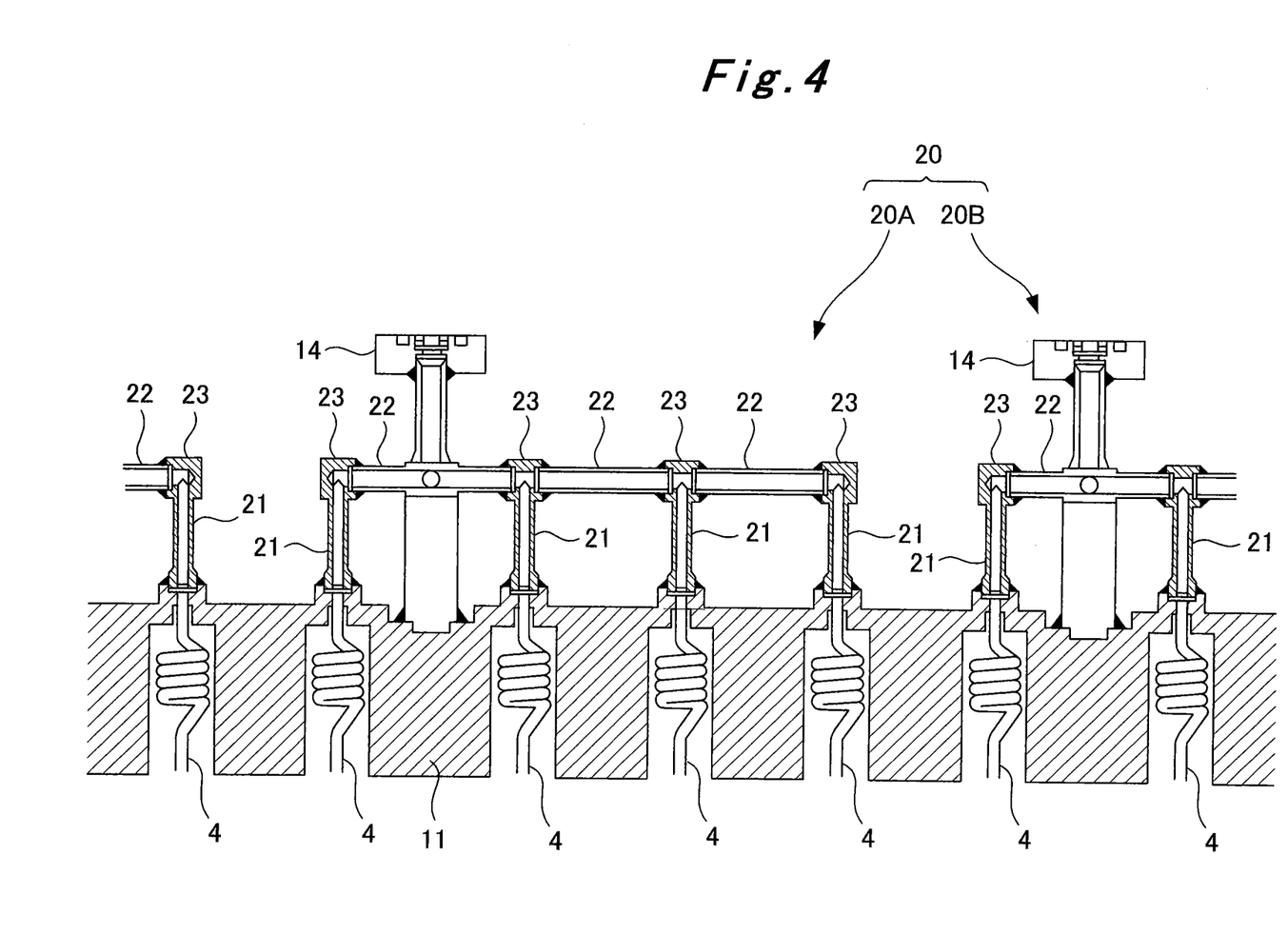
[FIG. 4] is a development view showing the oil chamber piping, shown in FIG. 3, in a developed form.

In the conventional combustor, the oil chamber for distributing oil fuel to the main nozzles has been provided inside the nozzle pipe base for supporting the pilot nozzle and the main nozzles. The combustor 1 of the present embodiment, on the other hand, is of a configuration in which oil chamber piping corresponding to the oil chamber is provided outside the nozzle pipe base 11, rather than inside the nozzle pipe base 11. This configuration will be explained by FIG. 2 showing a perspective view of the head of the combustor 1, FIG. 3(*a*) showing a top view of the head of the combustor 1, FIG. 3(*b*) showing a top view of the oil chamber piping, and FIG. 4 showing a development view of the oil chamber piping. To facilitate the understanding of this configuration, bolt holes and bolts shown in FIG. 2 are omitted in FIG. 3(*a*), only the oil chamber piping is extracted in FIG. 3(*b*), and the oil chamber piping is developed in its circumferential direction in illustrating the head of the combustor 1.

In the combustor 1 of the present embodiment, all the central pipes 4 are provided to penetrate the nozzle pipe base 11 for supporting all the main nozzles 3. Lengths of oil chamber piping 20 (20A, 20B) corresponding to the oil chamber have a plurality of lengths of upright piping 21 which are connected to the central pipes 4 of the respective main nozzles 3 and which are vertically erected from the nozzle pipe base 11, and a plurality of lengths of connection piping 22 which interconnect the adjacent lengths of the upright piping 21 in a polygonal shape at a minimum distance. In the present embodiment, eight lengths of the upright piping 21 are erected in correspondence with the number of the main nozzles, 3. These eight lengths of the upright piping 21 are divided into two groups 20A and 20B, each group of the four lengths. In each of the groups 20A and 20B, the adjacent lengths of the upright piping 21 are interconnected by the three lengths of the connection piping 22 with the use of connecting joints 23. In each of the groups 20A and 20B, a main nozzle oil fuel supply section 14 is connected to one of the lengths of the connection piping 22. If oil fuel is used, therefore, oil fuel is distributed from the main nozzle oil fuel supply section 14 to each of the lengths of the upright piping 21 via the three lengths of the connection piping 22, and is supplied to the central pipe 4 of each main nozzle 3.

Because of the above-described configuration of the oil chamber piping 20, a polygon having a plurality of vertices or apices is formed in each of the groups 20A and 20B. In the polygon, there certainly is the lowermost apex, namely, the connecting joint 23 (upright piping 21) at the lowermost position. When the use of oil fuel is stopped, or when the oil fuel is switched to gas fuel, the connecting joint 23 at the lowermost position can be used as an oil reservoir. The upright piping 21 and the connecting joint 23 may be integral. By performing an air purge, oil fuel is discharged via the length of the upright piping 21 located at the lowermost position to prevent oil fuel from remaining. No matter which direction the combustor 1 is mounted in, the same is true. Of the four lengths of the upright piping 21 in each of the groups 20A and 20B, one is located at a lower position than all of the other lengths of the upright piping 21. As a result, oil fuel is discharged from the lowermost length of the upright piping 21, thereby preventing oil fuel from remaining. The combustor 1 is disposed such that the direction of an arrow shown in each of FIGS. 3(a) and 3(b) is always the outer peripheral direction of the combustor 1.

Since the oil chamber piping 20 is provided outside the nozzle pipe base 11, its surroundings are in the atmosphere, where oil fuel is not heated. The nozzle pipe base 11 is influenced by high temperature combustion air flowing inside the combustor 1. However, the oil chamber piping 20 is provided to be separated from the nozzle pipe base 11 as mentioned above, whereby the influence of the temperature from the nozzle pipe base 11 is lessened. Moreover, there is no need to form the pneumatic heat insulating layer separately, as done in the cited document 2. Because of the simple configuration, as seen here, the influence of the temperature from the nozzle pipe base 11 is curbed, and the cost is reduced.

The upright piping 21 may, at least, penetrate the nozzle pipe base 11. If the central pipe 4 penetrates the nozzle pipe base 11 as in the present embodiment, the upright piping 21 may be omitted, and the connection piping 22 may be directly connected to the central pipe 4 itself. When the upright piping 21 is welded to the side of the nozzle pipe base 11, a portion, other than that to be welded, of its base metal pipe is machined to be slightly thin-walled, and then welded. This procedure is performed in order that a force acting on the oil chamber piping 20 is borne by such a thin-walled portion as well to distribute the force acting on the welded portion. In order to distribute this force further, it is desirable that the upright piping 21 be long. Too large a length, however, may cause vibration, so that the length is set as appropriate.

In the present embodiment, the plurality of the lengths of the upright piping 21 are divided into the two groups, 20A and 20B, in consideration of the arrangement of the gas fuel supply section 15, and an atomized system supply section 17 with respect to the pilot nozzle 2. However, the lengths of the upright piping 21 need not necessarily be divided into a plurality of groups, and there may be adopted a configuration in which all the lengths of the upright piping 21 are brought into communication with each other by the lengths of the connection piping 22. Even in this case, the lengths of the connection piping 22 are arranged in a polygonal shape. If the number of the main nozzles 3 is even greater, by contrast, there may be adopted a configuration in which the plurality of the lengths of the upright piping 21 are divided not into the two groups, but into even more groups. Alternatively, the number of the lengths of the upright piping 21 divided into groups may be different in each group. In any of the above cases, the length of the upright piping 21 (connecting joint 23) located at the lowermost position exists in each group. Thus, during stoppage of the use of oil fuel, or when oil fuel is switched to gas fuel, the connecting joint 23 located at the lowermost position becomes an oil reservoir, and oil fuel is discharged via the lowermost length of the upright piping 21 to prevent oil fuel from remaining.

As seen above, the oil chamber piping 20 is of a simple structure provided outside the nozzle pipe base 11, and its maintainability can be improved. Furthermore, the upright piping 21 and the connection piping 22 may be standard pipes which are generally used, so that their production costs can be decreased. Besides, the upright piping 21 and the connection piping 22 are straight pipes. Thus, the rigidity of the oil chamber piping 20 itself can be rendered high.

INDUSTRIAL APPLICABILITY

The present invention is suitable for a gas turbine combustor in a dual mode in which fuel can be switched between oil fuel and gas fuel.

The invention claimed is:

1. A gas turbine combustor having a plurality of main nozzles annularly supported on a nozzle pipe base, the main nozzles each having an oil fuel path for supplying oil fuel and a gas fuel path for supplying gas fuel,
   characterized in that a plurality of the oil fuel paths are provided to penetrate the nozzle pipe base,
   a plurality of lengths of connection piping for interconnecting the oil fuel paths in a polygonal shape at a minimum distance are provided outside the nozzle pipe base, and
   an oil fuel supply section is connected to one of the lengths of the connection piping to distribute oil fuel to each of the oil fuel paths.

2. A gas turbine combustor having a plurality of main nozzles annularly supported on a nozzle pipe base, the main nozzles each having an oil fuel path for supplying oil fuel and a gas fuel path for supplying gas fuel,
   characterized in that a plurality of the oil fuel paths are provided to penetrate the nozzle pipe base, and a plurality of lengths of upright piping are provided to be connected to the oil fuel paths, respectively, and be erected on the nozzle pipe base,
   a plurality of lengths of connection piping for interconnecting the lengths of the upright piping in a polygonal shape at a minimum distance are provided outside the nozzle pipe base, and
   an oil fuel supply section is connected to one of the lengths of the connection piping to distribute oil fuel to each of the oil fuel paths.

3. The gas turbine combustor according to claim 1 or 2, characterized in that
   the plurality of the oil fuel paths or the plurality of the lengths of the upright piping are divided into a plurality of groups,
   in each of the groups, the oil fuel paths or the lengths of the upright piping are interconnected by the lengths of the connection piping, and
   the oil fuel supply section is connected to one of the lengths of the connection piping in each of the groups.

* * * * *